United States Patent [19]

Hoshi

[11] Patent Number: 5,496,983
[45] Date of Patent: Mar. 5, 1996

[54] LASER GUIDED DISCHARGE MACHINING APPARATUS AND METHOD

[75] Inventor: Yoshinobu Hoshi, Tsukuba, Japan

[73] Assignees: Agency of Industrial Science & Technology; Ministry of International Trade & Industry, both of Tokyo, Japan

[21] Appl. No.: 285,448

[22] Filed: Aug. 5, 1994

[30] Foreign Application Priority Data

Aug. 5, 1993 [JP] Japan .................... 5-213339

[51] Int. Cl.⁶ .................................................. B23H 1/00
[52] U.S. Cl. .................................. 219/69.17; 219/69.11
[58] Field of Search ........................... 219/69.17, 69.11, 219/121.84, 121.78, 121.86, 121.15; 118/723 CB, 723 EB; 427/508, 509, 524, 526

[56] References Cited

U.S. PATENT DOCUMENTS 3,214,563  10/1965  Ford ................................... 219/69.17
4,448,802   5/1984  Buhl et al. ......................... 118/723 EB
4,559,115  12/1985  Inoue ................................. 219/69.17
4,564,739   1/1986  Mattelin ........................... 219/121.78
4,639,301   1/1987  Doherty et al. ..................... 427/524
4,689,467   8/1987  Inoue ................................ 219/121.84
4,847,463   7/1989  Levy et al. ......................... 219/69.17
5,006,688   4/1991  Cross ................................ 219/121.64
5,049,720   9/1991  Fang et al. ......................... 219/121.84

FOREIGN PATENT DOCUMENTS 5-112810  5/1993  Japan .
5-112815  5/1993  Japan .

*Primary Examiner*—Geoffrey S. Evans
*Attorney, Agent, or Firm*—Oblon, Spivak, McClelland, Maier & Neustadt

[57] ABSTRACT

A laser guided discharge machining apparatus includes a vacuum chamber in which pressure can be reduced to 3000 Pa or below and in which a workpiece is accommodated as well as a discharge electrode that emits charged particles. A laser beam is used to guide the discharge to thereby enable parts of the workpiece to be discharge machined which are not in a direct line from the discharge electrode.

3 Claims, 5 Drawing Sheets

LASER GUIDED DISCHARGE MACHINING APPARATUS AND METHOD

BACKGROUND OF THE INVENTION

1. Field of the Invention

This invention relates to a discharge apparatus and method used for diesinking and other metal machining applications, and more particularly to a laser guided discharge apparatus and method used for machining the surface of a workpiece.

2. Description of the Prior Art

Discharge machining is used to cut and shape metal products. In conventional discharge machining, the workpiece is disposed opposite the work electrode and a discharge is induced from the electrode to the workpiece, with the workpiece being machined by the impact of the discharge. There is a diesinking discharge machining method and a wire discharge machining method. In the former method, the machining is carried out with an electrode having the required shape to which the workpiece is to be machined pressed onto the workpiece, while in the latter method cutting is performed using a straight electrode.

The conventional discharge machining methods therefore use a technique in which the workpiece and electrode are positioned in opposition to each other and a discharge is produced from the electrode to the workpiece, whereby the heat of the discharge melts a portion of the workpiece, and the explosive vaporization of the machining fluid that takes place at the same time is used to blow away the melted portion. Thus, in both of the above discharge machining methods the discharge electrode has to be arranged opposite the part of the workpiece to be machined. Even in the case of conventional laser-induced discharge machining, the discharge electrode has to be more or less directly opposite to the portion to be machined. As such, a discharge machining apparatus has only been able to be used to machine parts which can be directly seen from the discharge electrode, meaning that machining the inside of a pot with a small mouth, for example, has not been possible with such an apparatus. This has made it desirable to develop discharge machining technology that can be used to machine parts which are not in a direct line of sight position relative to the electrode.

An object of the present invention is to provide a discharge machining apparatus and method that can be used to machine the rear surface of a workpiece or other such parts that are not in a direct line from the discharge electrode.

SUMMARY OF THE INVENTION

In accordance with this invention, the above object is attained by a laser guided discharge machining apparatus comprising a vacuum chamber able to accommodate a workpiece and a discharge electrode and in which it is possible to create a reduced pressure condition of 3000 Pa or below, and a laser irradiation apparatus able to irradiate a part of the rear surface of the workpiece that is not facing the discharge electrode, and by a laser guided discharge machining method comprising housing a workpiece and a discharge electrode in a vacuum chamber, reducing the pressure in the vacuum chamber to 3000 Pa or below, and projecting a laser beam at a part of the workpiece that is not in a direct line of sight with the discharge electrode.

In a reduced pressure environment of 3000 Pa or below, the laser irradiates a part of the workpiece that is not in a direct line of sight position relative to the discharge electrode, and when the discharge is triggered the charged particles discharged from the electrode follow the line of electrical power around to the rear of the workpiece, and are induced by the laser beam to cause them to impinge on the workpiece at the point at which the workpiece is being irradiated by the laser beam, thereby machining the workpiece at that point. Moving the laser beam results in a corresponding shift in the location of the machining. In this way, it is possible to perform three-dimensional machining of parts that are not directly viewable from the discharge electrode.

Further features of the invention, its nature and various advantages will be more apparent from the accompanying drawings and following detailed description of the invention.

DESCRIPTION OF THE PREFERRED EMBODIMENT

Figure 1:
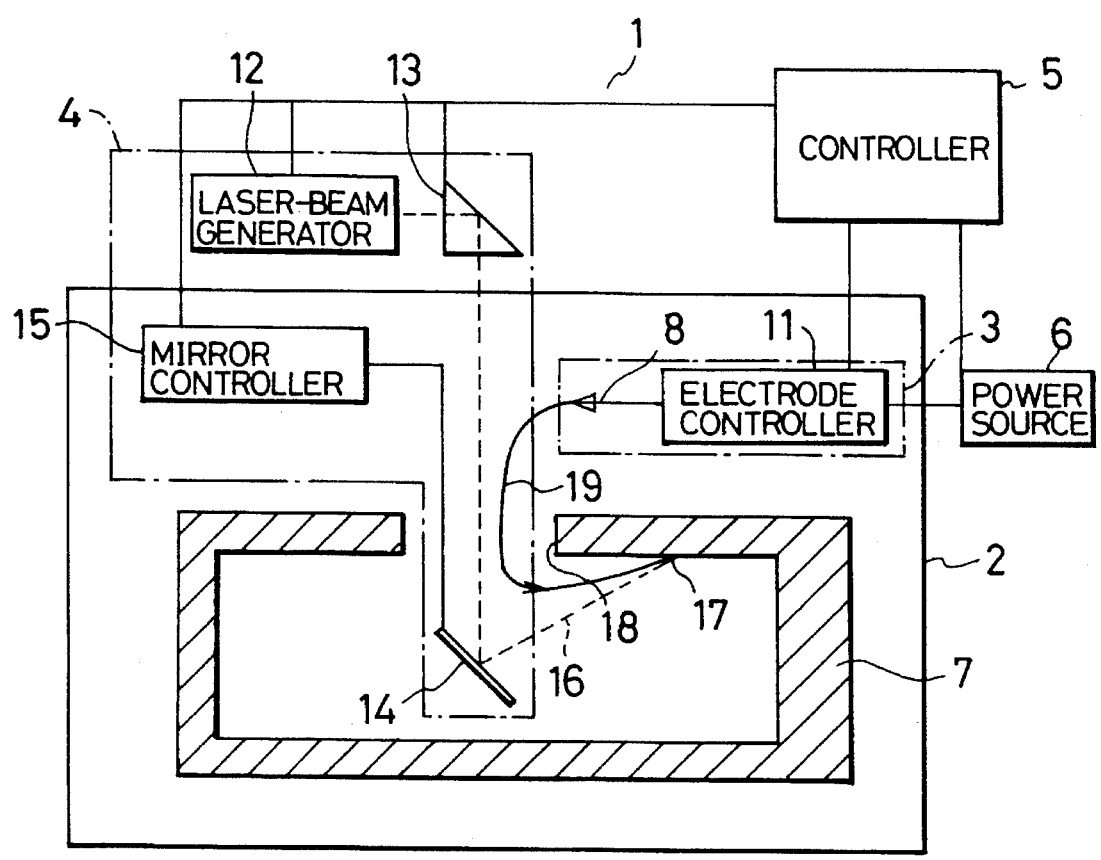
FIG. 1 is a block diagram of the discharge machining apparatus according to one embodiment of the invention.

Details of an embodiment of the present invention will now be described with reference to the drawings. In FIG. 1, reference numeral 1 denotes a discharge machining apparatus which is provided with a vacuum chamber 2, a discharge apparatus 3, a laser irradiation apparatus 4, a controller 5 and an electrical power source 6. The pressure in the vacuum chamber 2 can be reduced to 3000 Pa or below, and the interior of the vacuum chamber 2 can accommodate a workpiece 7. The discharge apparatus 3 has an electrode 8 and an electrode controller 11. The electrode controller 11 pays out more of the electrode 8 to compensate for wear to the electrode 8, and controls the current from the power source 6 to a set value for delivery to the electrode 8. The electrode controller 11 is controlled by the controller 5. The controller 5 may be constituted by a computer, for example.

The laser irradiation apparatus 4 is comprised of a laser-beam generator 12 forming a laser induction apparatus, which is provided with a laser controller 13, a mirror 14 and a mirror controller 15. As the laser-beam generator 12, there may be used a YAG laser, for example, that has a pulse power of 0.5 J and produces a discharge at 100 to 1,000 volts. The laser controller 13 adjusts the path of the laser to guide the laser beam 16 inside the vacuum chamber 2; a commercially available scanner may be used as the laser controller 13. The mirror 14 is arranged inside the vacuum chamber 2 facing a target region 17 of the workpiece 7 to be machined. The mirror 14 reflects the laser beam 16 from the laser controller 13 onto the region 17. The mirror controller 15 controls the angle of the mirror 14 in accordance with commands received from the controller 5 and is used to adjust the position of the workpiece 7 that is irradiated by the laser beam 16.

With the discharge machining apparatus 1 having the above configuration, to perform discharge machining of a region 17 that is on the other side of a workpiece 7 and therefore is hidden from the electrode 8, the laser controller 13 and mirror 14 are adjusted to cause the laser beam emitted by the laser-beam generator 12 to be reflected by the mirror 14 onto the region 17. When this takes place, the pressure in the vacuum chamber 2 has been reduced to 3000 Pa or below. Such a reduced pressure makes it easier for charged particles generated by the laser irradiation to reach the electrode 8, so that in accordance with Paschen's law, it becomes possible for the discharge distance to be increased, enabling the discharge to reach a distant point such as the inside of a pot. Upon irradiating the workpiece 7 with the laser beam 16, the charged particles 19 are generated and spread within the vacuum chamber 2. When the charged particles have reached the electrode 8, the discharge from the electrode 8 goes around the edge 18 of the workpiece 7 to the interior thereof to start machining of the region 17. Machining of a prescribed shape is carried out by moving the laser beam 16 appropriately by using the mirror controller 15 to adjust the angle of the mirror 14 as required.

The following experiments were performed to demonstrate that a part of a workpiece not in a direct line from the discharge electrode can be discharge machined.

Figure 2:
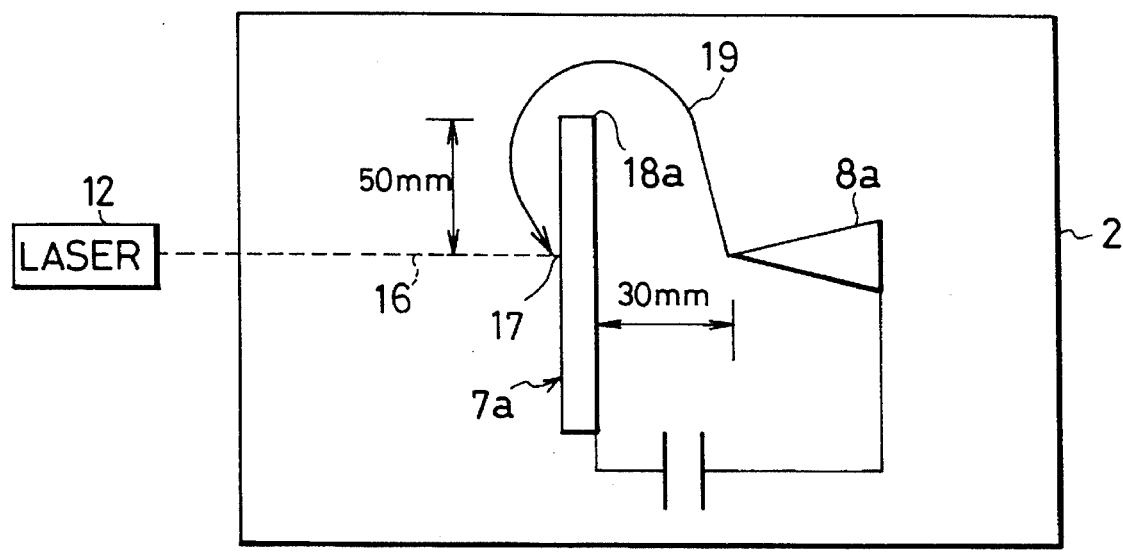
FIG. 2 is a block diagram of an experimental discharge machining apparatus according to the invention.

As shown in FIG. 2, an electrode 8a and a workpiece 7a in the form of a brass plate were arranged facing each other inside a vacuum chamber 2, and point 17 on the rear side of the workpiece 7a was irradiated by a YAG laser beam (0.5 J). Laser-beam irradiation and discharge were performed with the air pressure inside the vacuum chamber at 10 Pa, a workpiece 7a thickness of 1 mm, a distance between the edge 18a of the workpiece 7a and point 17 of 50 mm and a distance between the electrode 8a and the surface of the workpiece 7a of 30 mm. The discharge current was from 30 A to 50 A and the pulse width was from 10 to 15 μsec. The discharge from the electrode 8a went around the workpiece edge 18a. reaching to the rear surface, and was guided to point 17 by the laser beam 16, and point 17 was thereby machined.

Figure 3:
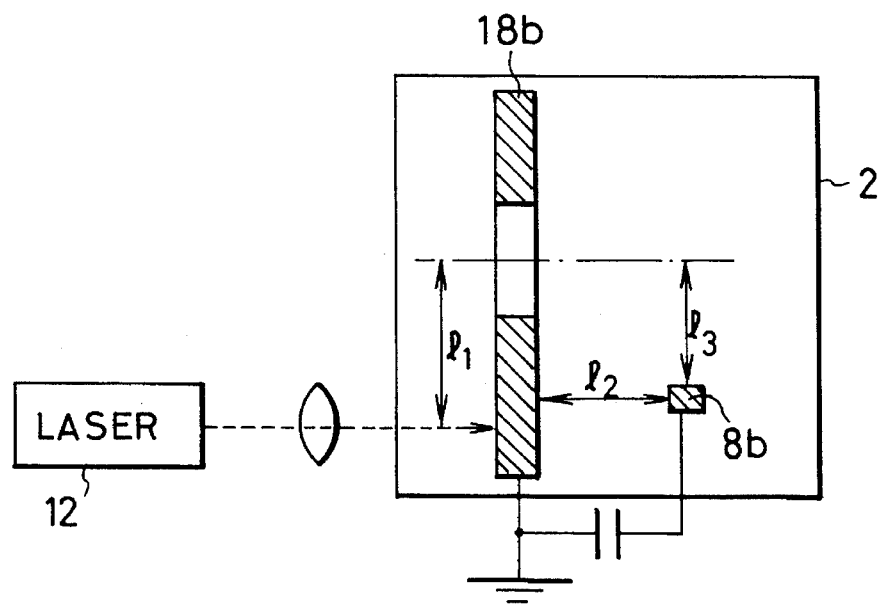
FIG. 3 is a block diagram of another experimental discharge machining apparatus according to the invention.

With reference to FIG. 3, an experiment was performed consisting of using a YAG laser 12 (with a power of 0.45 J and a pulse width of 1 msec) to irradiate one surface (the surface on the left side, in the drawing) of a cathode plate 18b as the workpiece, and causing a discharge from the anode 8b disposed at the opposite (right) side to be induced through a hole in the cathode plate to the point of laser beam irradiation. The anode 8b was copper wire 1 mm in diameter, 1 mm of which was exposed so that discharge occurred only at that tip. As the cathode 18b, three brass plates were prepared, each measuring 100 mm by 150 mm by 1 mm thick and having a hole 25 mm in diameter. The distances $l_1$ from the center axes of the holes formed in the three plates to the point of laser-beam irradiation were 25 mm, 45 mm and 75 mm, respectively. Further, the distance between the anode 8b and the cathode plate 18b was denoted by $l_2$ and the distance between the anode 8b and the center axis of the hole formed in the cathode plate 18b by $l_3$. For the experiment, voltages ranging from 100 v to 1 kV were applied across the electrodes, and laser beam irradiation was carried out manually. At high voltages discharge took place within a radius of about 10 mm around the point of laser irradiation (with a beam radius of 1 mm). In this case and when the discharge was within the laser beam point, it was considered that the discharge was guided.

Figure 4:
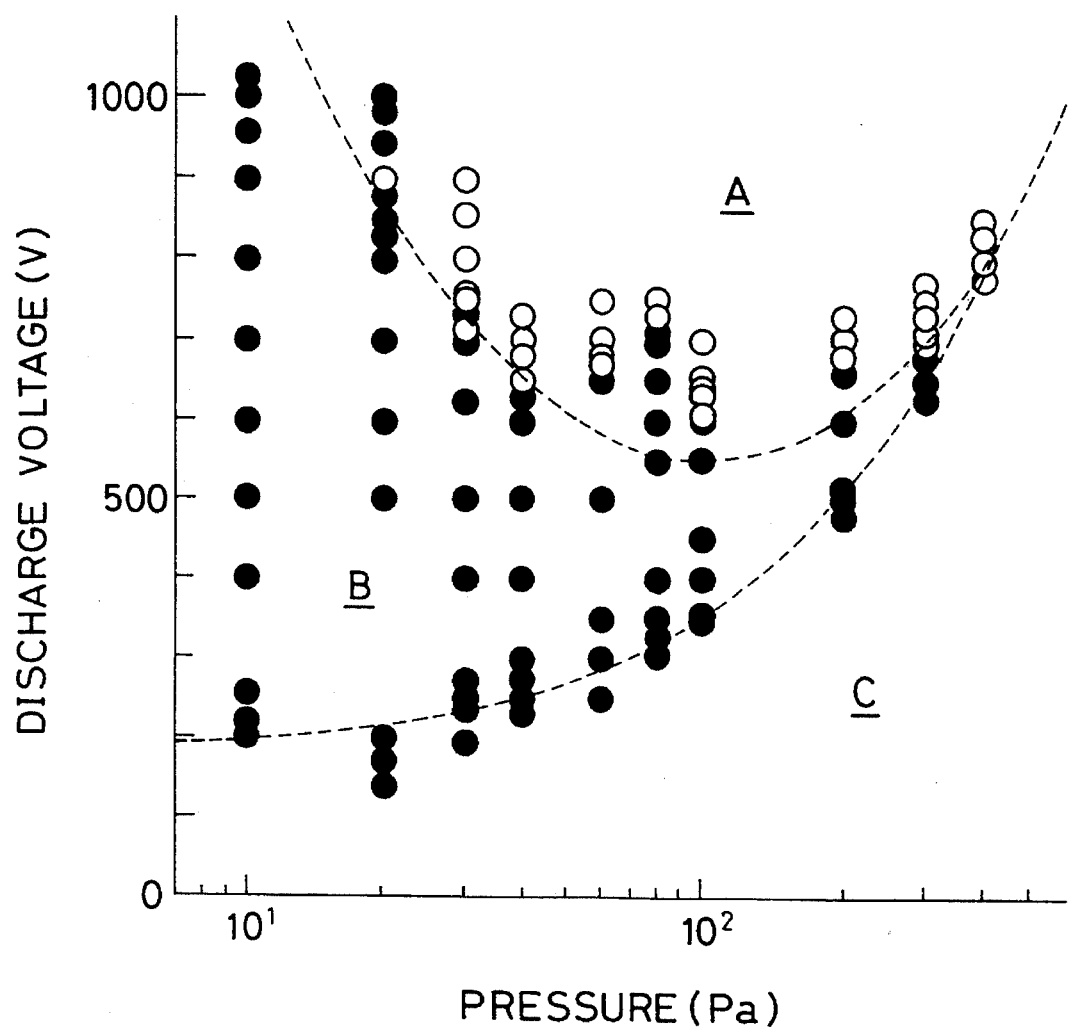
FIG. 4 is a graph showing the relationship between pressure and discharge induction characteristics.

FIG. 4 is a plot of discharge guidance characteristics at each pressure with respect to an electrode position $l_1$ of 45 mm, $l_2$ of 32 mm and $l_3$ of 0 mm. This plot can be divided into the following three regions: "A", where spontaneous discharge takes place or guided discharge does not take place, "B", where discharge is guided, and "C" where discharge cannot be triggered by laser. Lowering the air pressure lowers the minimum voltage of laser guided discharge (hereinafter also referred to as "minimum discharge voltage"). Also, there is an increase in the maximum voltage at which a discharge can be guided, which at 10 Pa exceeds 1 kV.

Figure 5:
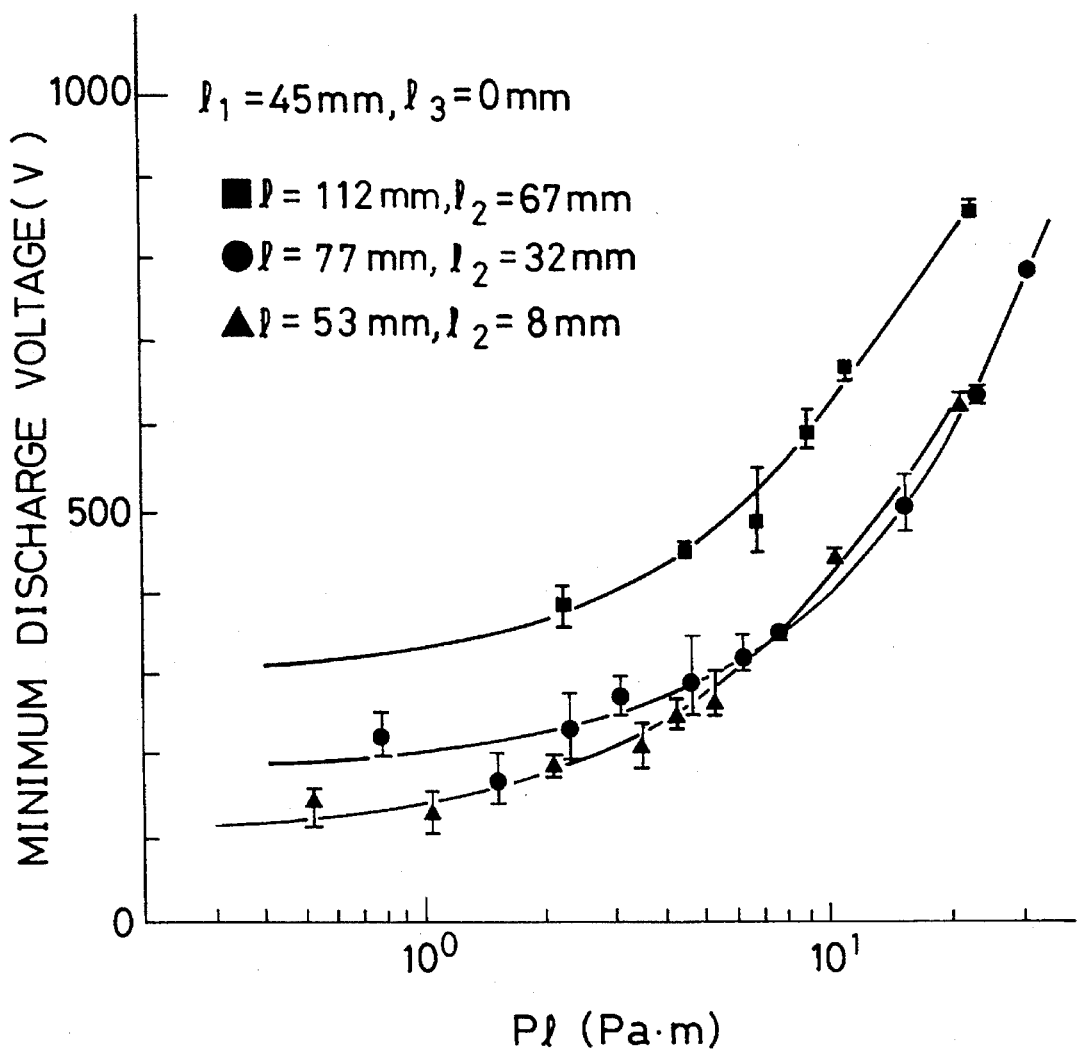
FIG. 5 is a graph showing the relationship between minimum discharge voltage for laser guidance and distance between the anode and the hole in the cathode.
Figure 6:
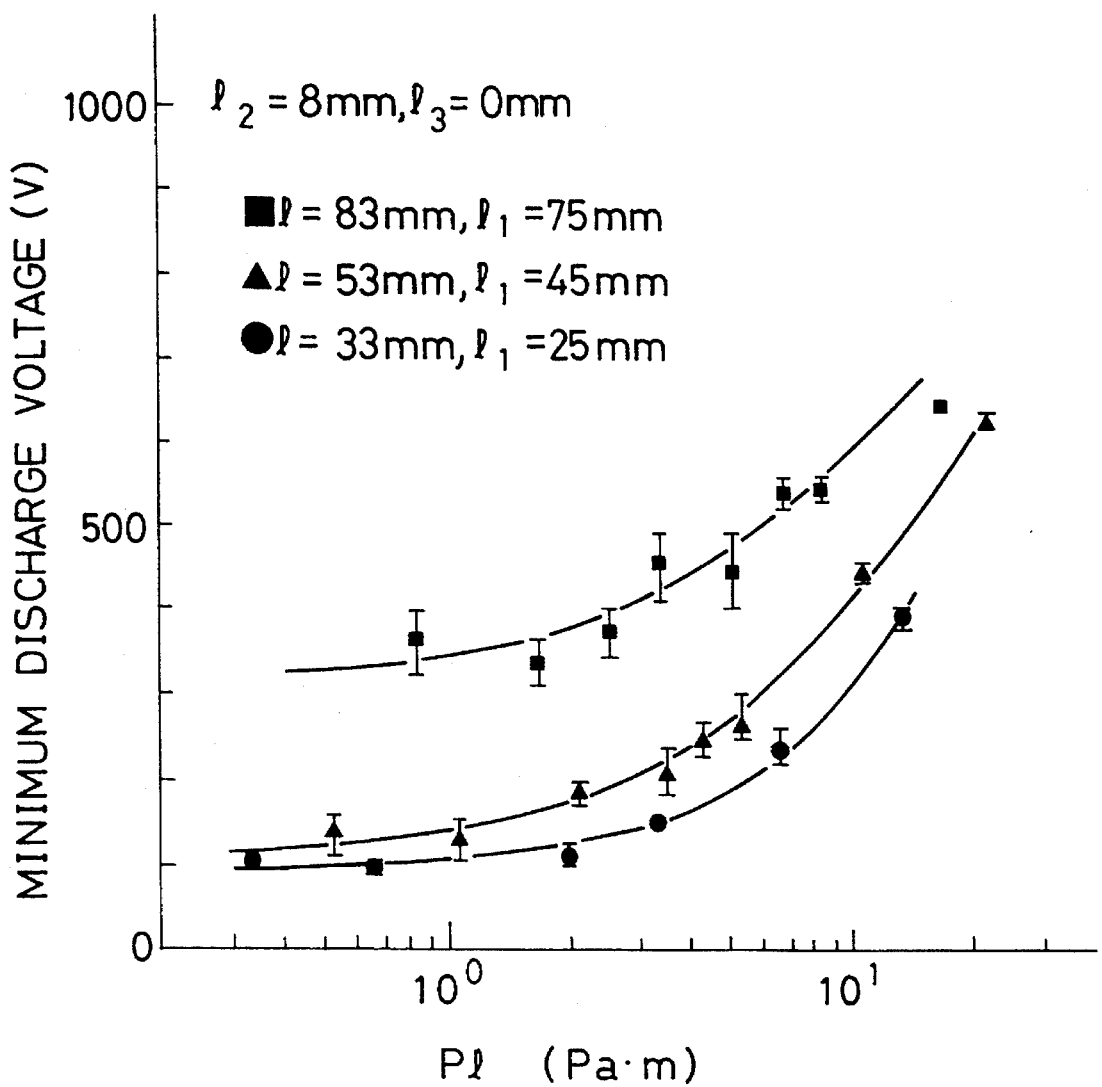
FIG. 6 is a graph showing the relationship between minimum discharge voltage for laser guidance and the distance between the hole in the cathode and the laser beam spot.

At high discharge voltages discharge takes place around the laser beam spot, and if the voltage is raised still further, guidance becomes impossible, as can be seen from FIG. 4. It was thought that for precision, discharge machining should be performed using the lowest possible voltage. The minimum discharge voltage was therefore investigated while varying the relative position of the electrodes. FIG. 5 shows the results of the investigation of minimum discharge voltage in which $l_1$ was fixed at 45 mm and $l_3$ at 0 mm, and $l_2$ was varied from 8 mm, to 32 mm, to 67 mm. FIG. 6 shows the results of the investigation of minimum discharge voltage in which $l_2$ was fixed at 8 mm and $l_3$ at 0 mm, and $l_1$ was varied from 25 mm, to 45 mm, to 75 mm. If it is considered that $l=l_1+l_2+l_3$, while $l$ may not necessarily be the discharge distance, it can be regarded as being a value approximately proportional thereto.

Looking at the minimum discharge voltage, while there is a broad similarity with respect to FIG. 5 in which l=53 mm and 77 mm and FIG. 6 in which l=33 mm and 53 mm, the voltage becomes high at longer distances of l=112 mm or 83 mm. This indicates that while at smaller distances of from around 33 mm to 77 mm the minimum discharge voltage is within a fixed range with respect to the product of pressure and distance (P×l), an increase takes place when a certain distance is exceeded, such as at 83 mm to 112 mm.

Although there is only a small difference between l in FIG. 6 (83 mm) and l in FIG. 5 (77 mm), under the same pressure conditions the minimum discharge voltage is high. It is rather that with the 83 mm of FIG. 6 and the 112 mm of FIG. 5, the minimum discharge voltage values at each pressure are close. This shows that $l_1$ has more of an influence than $l_2$ on the rise in the minimum discharge voltage.

It was confirmed that the position of a discharge on the rear of a workpiece or other such hidden locations can be controlled using a laser to guide the discharge. It was found that the laser guidance of a discharge is dependent on the air pressure, the voltage and the distance between the electrodes. Up to a certain distance the minimum discharge voltage is determined by the product of the pressure and the distance, but when that distance is exceeded, the distance between the hole in the cathode and the laser beam spot has more of a bearing on the minimum discharge voltage than the distance between the cathode hole and the anode.

The discharge machining apparatus of this invention can be used to machine the rear surface and other such parts of a workpiece, which is not possible with conventional discharge machining methods. Moreover, unlike conventional methods, this invention does not require the use of an electrode having the same shape as the shape to which the workpiece is to be machined. Furthermore, with this invention the machining contour is controlled by the laser beam spot, without any need to move the electrode. Because the discharge machining point is precisely guided by the laser beam, precision machining is possible. Also, the machining operation is facilitated by the fact that discharge timing can be controlled by laser.

Japanese Patent Application No. 5-213339 filed Aug. 5, 1993 is hereby incorporated by reference.

What is claimed is:

1. A laser guided discharge machining apparatus comprising:
   a vacuum chamber in which pressure can be reduced to 3000 Pa or below;
   a workpiece accommodated in the vacuum chamber;
   a discharge electrode that emits charged particles, said discharge electrode being accommodated in the vacuum chamber;
   a laser that projects a laser beam toward the vacuum chamber; and
   laser beam guidance means for projecting the laser beam at a part of the workpiece to be machined that is not in a direct line of sight relative to the discharge electrode.

2. An apparatus according to claim 1, wherein the laser beam guidance means comprises a mirror control means and a mirror, and wherein the angular position of the mirror is controlled by the mirror control means.

3. A laser guided discharge machining method, comprising:
   housing a workpiece and a discharge electrode in a vacuum chamber;
   reducing the pressure in the vacuum chamber to 3000 Pa or below;
   projecting a laser beam at a part of the workpiece that is not in a direct line of sight with the discharge electrode; and
   emitting charged particles with said discharge electrode to machine said part of said workpiece.

* * * * *

UNITED STATES PATENT AND TRADEMARK OFFICE
CERTIFICATE OF CORRECTION

PATENT NO. : 5,496,983
DATED : March 5, 1996
INVENTOR(S) : Yoshinobu HOSHI

It is certified that error appears in the above-indentified patent and that said Letters Patent is hereby corrected as shown below:

On the title page, Item [73], the Assignee is written incorrectly. It should read:

--[73] Assignee: Agency of Industrial Science & Technology, Ministry of International Trade & Industry, Tokyo, Japan--

Signed and Sealed this

Fourth Day of June, 1996

Attest:

BRUCE LEHMAN

Attesting Officer

Commissioner of Patents and Trademarks